(12) United States Patent
Hwang et al.

(10) Patent No.: US 7,894,862 B2
(45) Date of Patent: Feb. 22, 2011

(54) DATA TRANSCEIVER AND DATA RECEPTION METHOD THEREOF IN A MOBILE COMMUNICATION SYSTEM

(75) Inventors: Hyo-Sun Hwang, Seoul (KR); Jong-Ae Park, Yongin-si (KR); Dong-Jun Lee, Seoul (KR); Jung-Hoon Suh, Yongin-si (KR); Kyung-Hun Jang, Suwon-si (KR); Young-Soo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 886 days.

(21) Appl. No.: 11/709,442

(22) Filed: Feb. 22, 2007

(65) Prior Publication Data

US 2007/0275671 A1 Nov. 29, 2007

(30) Foreign Application Priority Data

Feb. 22, 2006 (KR) ...................... 10-2006-0017207

(51) Int. Cl.
*H04M 1/00* (2006.01)

(52) U.S. Cl. ....................... 455/574; 455/572; 455/522; 455/69; 455/526; 455/502; 455/67.11; 455/67.13; 370/338; 370/503; 370/346; 370/349; 370/471

(58) Field of Classification Search ................. 455/574, 455/572, 522, 526, 69, 502, 67.11, 67.13; 370/503, 338, 471, 449, 346, 349
See application file for complete search history.

(56) References Cited

U.S. PATENT DOCUMENTS

| | | | |
|---|---|---|---|
| 5,673,259 A * | 9/1997 | Quick, Jr. ................... 370/342 |
| 5,920,592 A * | 7/1999 | Tanaka et al. ............... 375/220 |
| 6,034,952 A * | 3/2000 | Dohi et al. .................. 370/335 |
| 6,243,591 B1 * | 6/2001 | Takemura ................... 455/522 |
| 6,330,462 B1 * | 12/2001 | Chen ......................... 455/572 |
| 7,020,102 B2 * | 3/2006 | Tuomainen et al. ......... 370/311 |
| 7,031,294 B2 * | 4/2006 | Aiello et al. ................ 370/348 |
| 7,194,281 B2 * | 3/2007 | Peng et al. .................. 455/522 |
| 7,212,823 B2 * | 5/2007 | Granzow et al. ............ 455/450 |
| 7,317,691 B2 * | 1/2008 | Mills et al. .................. 370/252 |
| 7,403,511 B2 * | 7/2008 | Liang et al. ................. 370/338 |
| 7,411,903 B2 * | 8/2008 | Jang et al. ................... 370/230 |
| 7,477,876 B2 * | 1/2009 | Das et al. ................. 455/67.13 |
| 7,489,668 B2 * | 2/2009 | Cho et al. ................... 370/338 |
| 7,512,423 B2 * | 3/2009 | Karaoguz ................... 455/574 |
| 7,570,621 B2 * | 8/2009 | Garg .......................... 370/335 |
| 7,613,462 B2 * | 11/2009 | Willenegger et al. ........ 455/450 |
| 7,623,884 B2 * | 11/2009 | Moon et al. ................. 455/522 |
| 7,688,768 B2 * | 3/2010 | Jang et al. ................... 370/311 |
| 7,701,889 B2 * | 4/2010 | Jang et al. ................... 370/311 |
| 7,706,816 B2 * | 4/2010 | Jang et al. ................... 455/458 |
| 2005/0018624 A1 * | 1/2005 | Meier et al. ................. 370/318 |

(Continued)

*Primary Examiner*—Marceau Milord
(74) *Attorney, Agent, or Firm*—NSIP Law

(57) ABSTRACT

A data transceiver and a data reception method for reducing power consumption in a mobile communication system are provided. The data transceiver includes a transmitter which transmits a plurality of data frames during a predetermined transmission period; and a receiver which receives data frames in the predetermined transmission period, if the transmission period is allowed and monitors with minimal operation power whether data transmission is in progress or completed in the transmission period, if the transmission period is not allowed.

17 Claims, 10 Drawing Sheets

U.S. PATENT DOCUMENTS

2005/0083867 A1* 4/2005 Dombrowski ............... 370/311
2007/0060132 A1* 3/2007 Wilhelmsson et al. ....... 455/445
2007/0161364 A1* 7/2007 Surineni et al. .......... 455/343.4

* cited by examiner

| Hardware part | | Cell area (mm²) | Cell area (%) | | Power (mW) | | Power (%) | |
|---|---|---|---|---|---|---|---|---|
| Tx | | 3.064 | 9.3 | | 6.3 | | 16 | |
| | Interleaver | 0.501 | | 1.5 | | 13 | | 3.3 |
| | Pilot_insert | 0.820 | | 2.5 | | 31 | | 7.9 |
| | Guard_insert | 1.011 | | 3.1 | | 4 | | 1 |
| | Inputbuffer | 0.201 | | 0.6 | | 1 | | 0.2 |
| | Tx_BIST | 0.130 | | 0.4 | | 1 | | 0.2 |
| Rx | | 22.201 | 67.6 | | 145 | | 36.9 | |
| | Synchronizer | 6.183 | | 18.8 | | 25 | | 6.4 |
| | Chanel_est. | 5.297 | | 16.1 | | 15 | | 3.8 |
| | Viterbi_dec | 5.910 | | 18.0 | | 53 | | 13.5 |
| | CE_buffer | 1.446 | | 4.4 | | 13 | | 3.3 |
| | Deinterleaver | 1.786 | | 5.4 | | 21 | | 5.3 |
| | Demapper | 0.422 | | 1.3 | | 1 | | 0.2 |
| | Interleaver | 0.630 | | 1.9 | | 7 | | 1.8 |
| | Rx_BIST | 0.247 | | 0.8 | | 1 | | 0.5 |
| FFT/IFFT | | 7.556 | 32.0 | | 41 | | 10.4 | |
| Total | | 32.851 | 100 | | 393 | | 100 | |

FIG.10

DATA TRANSCEIVER AND DATA RECEPTION METHOD THEREOF IN A MOBILE COMMUNICATION SYSTEM

PRIORITY

This application claims the benefit under 35 U.S.C. §119 (a) of a Korean Patent Application filed in the Korean Intellectual Property Office on Feb. 22, 2006 and assigned Serial No. 2006-17207, the disclosure of which is incorporated herein by reference.

BACKGROUND OF THE INVENTION

1. Field of the Invention

The present invention generally relates to an apparatus and method for transmitting and receiving data, and in particular, to an apparatus and method for saving power during data transmission and reception.

2. Description of the Related Art

In general, a Mobile Station (MS) in a mobile communication system is configured to receive its operational power from a battery. Thus, the operational power is often limited. Much effort, however, has been expended on minimizing the power consumption of the MS in order to increase its operation time.

FIGS. 1 and 2 illustrate examples of unnecessary power consumption of an MS during data transmission in a conventional mobile communication system. Data transmission is contention-based, as illustrated in FIG. 1, while it is non-contention-based in FIG. 2.

Moreover, in FIGS. 1 and 2, it is assumed that a transmitter (TX) sends a plurality of data frames to a first receiver (RX #1) during a determined transmission period. A second receiver (RX #2) receives the data frames sent by the transmitter or ACKnowledgement (ACK) signals sent by the first receiver. If the second receiver is aware that the destination of the data frames or the ACK signals is not the second receiver, it discards the received data frames or ACK signals.

Conventionally, the receivers keep connected to the transmitter by receiving all data frames or ACK signals. Therefore, the second receiver consumes power by unnecessarily receiving data frames or ACK signals that it is not supposed to receive.

In a conventional mobile communication system, a Base Station (BS) sends channel assignment information to a MS beforehand so that the MS can enter into a sleep mode when needed. In essence, the sleep mode is a state where power supply is blocked from the MS and thus the MS is not capable of reception, let alone transmission. Therefore, if the MS enters into the sleep mode, it is unaware of the state of a mobile communication network. Moreover, in order to receive an allocated channel, the MS must awaken from the sleep mode and perform a connection procedure with the BS.

SUMMARY OF THE INVENTION

An aspect of exemplary embodiments of the present invention is to address at least the problems and/or disadvantages and to provide at least the advantages described below. Accordingly, one aspect of an exemplary embodiment of the present invention is to provide an apparatus and method for enabling a receiver to be kept connected to a transmitter without receiving unnecessary signals.

Another aspect of an exemplary embodiment of the present invention is to provide an apparatus and method for enabling a MS to consume minimum power for maintaining a connection to a BS during a transmission period in which no signals exist for the MS.

Another aspect of an exemplary embodiment of the present invention is to provide an apparatus and method for blocking operational power from a receiver of a MS so that the receiver cannot consume the operational power for unnecessary signal reception.

According to one aspect of an exemplary embodiment of the present invention, there is provided a data transceiver in a mobile communication system. The data transceiver includes a transmitter that transmits a plurality of data frames during a predetermined transmission period; and a receiver that receives data frames in the predetermined transmission period, if the transmission period is allowed and monitors with minimal operation power whether data transmission is in progress or completed in the transmission period, if the transmission period is not allowed.

BRIEF DESCRIPTION OF THE DRAWINGS

The above and other objects, features and advantages of certain exemplary embodiments of the present invention will be more apparent from the following detailed description taken in conjunction with the accompanying drawings, in which:

FIG. 10 is a chart illustrating an example of a power saving method according to the present invention.

DETAILED DESCRIPTION OF EXEMPLARY EMBODIMENTS

Figure 1:
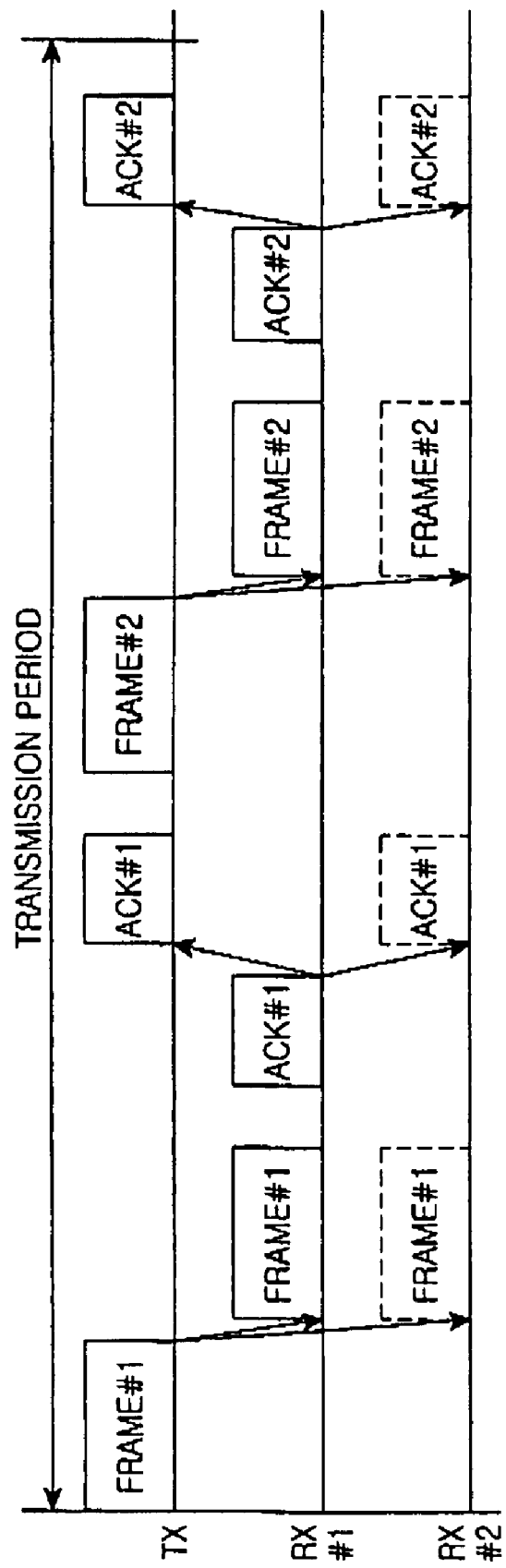
FIG. 1 illustrates an example of contention-based data transmission and data reception in a conventional mobile communication system.
Figure 2:
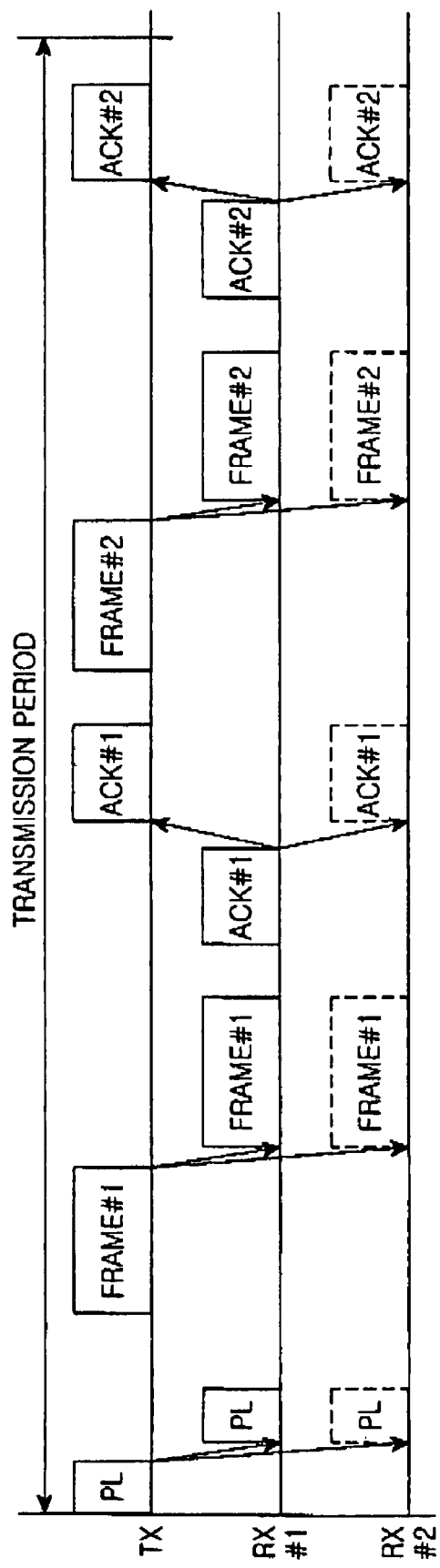
FIG. 2 illustrates an example of non-contention-based data transmission and data reception in the conventional mobile communication system.

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Throughout the drawings, the same drawing reference numerals will be understood to refer to the same elements, features and structures.

The present invention provides a data transceiver in a mobile communication system, which includes a transmitter for sending a plurality of data frames during a determined transmission period and a receiver for receiving a data frame during an allowed transmission period and monitoring with minimal operation power whether data transmission from the transmitter is completed during a non-allowed transmission period.

The present invention also provides a data reception method for receiving a data frame during an allowed transmission period and monitoring with minimal operation power whether data transmission from the transmitter is completed during a non-allowed transmission period in a mobile communication system where a plurality of data frames are sent during a determined transmission period.

In the data transceiver and the data reception method, the receiver determines whether a transmission period is allowed or not by a destination address of a first data frame received during the transmission period or a polling signal received from the transmitter at the start of the transmission period.

If the transmission period is not allowed for the receiver, the receiver supplies operational power only to a Radio Frequency (RF) processor and a signal strength detector for measuring the strength of a signal received through the RF processor.

Figure 3:
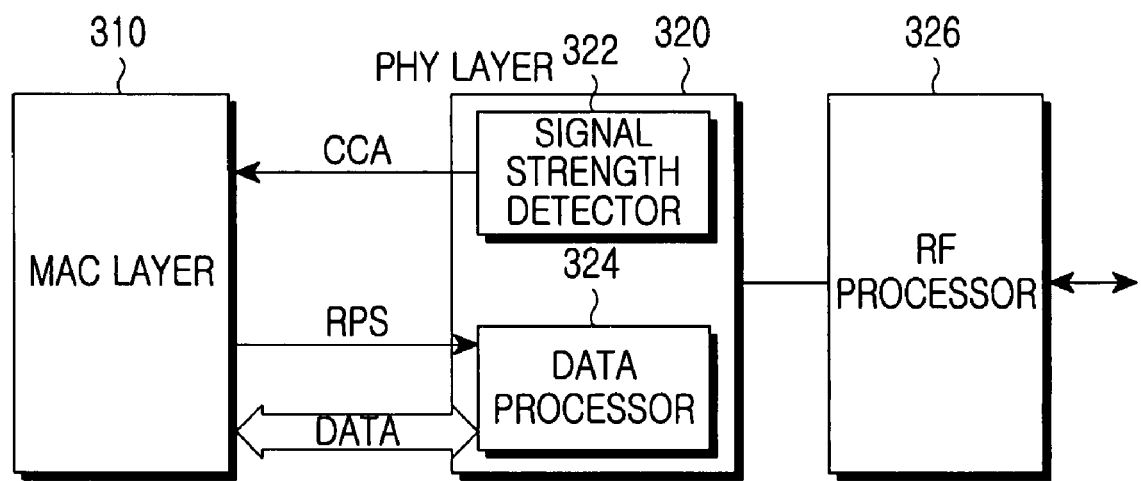
FIG. 3 is a schematic diagram of a receiver where a power saving method according to the present invention is applied.

FIG. 3 is a schematic diagram of a receiver where a power saving method according to the present invention is applied.

In FIG. 3, an RF processor 326 down-converts a received RF signal to an Intermediate Frequency (IF) signal. A data processor 324 processes the signal received from the RF processor 326 and controls the supply of operational power according to a Receiver Power Saving (RPS) signal received from a controller 310. Upon receipt of an RPS enable signal commanding power cut-off from the controller 310, the data processor 324 cuts off the operational power. Upon receipt of an RPS disable signal commanding power supply from the controller 310, the data processor 324 resumes the supply of the operational power.

A signal strength detector 322 measures the strength of the signal received from the RF processor 326 and generates a Clear Channel Assessment (CCA) by combining a few factors including the strength of the received signal and a signal quality assessed from a preamble. The CCA is generally a 1-bit data value indicating whether a channel delivers any signal (busy) or not (idle). For example, if the CCA is 1, the channel is busy and if the CCA is 0, the channel is idle.

The controller 310 determines whether a current transmission period is allowed for the receiver by a destination address of a data frame processed by the data processor 324 or a polling signal. If the current transmission period is not allowed, then the controller 310 provides the RPS disable signal to the data processor 324.

Next, the controller 310 then determines the presence or absence of any signal during the transmission period (i.e. whether the channel is busy or idle.) The determination is made based on the CCA received from the signal strength detector 322. If the channel is kept idle for a Short Inter-Frame Spacing (SIFS) or longer, the controller 310 considers that a current Transmission Opportunity (TXOP) is over.

In the absence of any signal during the current transmission period, the controller 310 provides the RSP disable signal to the data processor 324.

The signal strength detector 322 and the data processor 324 collectively form a physical layer 320. The controller 310 resides in a Medium Access Control (MAC) layer.

In a mobile communication system, data transmission is executed typically in two ways: contention-based and non-contention-based. The non-contention-based data transmission relies on a polling technique in which only an MS receiving a polling signal from a BS is entitled to send or receive data.

The power saving method of the present invention is based on the premise that a plurality of data frames are sent during a transmission period and the transmission period is dedicated to one MS in the mobile communication system. The power saving method would not be so effective in a mobile communication system where only one data frame is sent during a transmission period. Herein, a TXOP is set to a maximum value and a transmission period is determined within the maximum TXOP. In other words, the transmission period is set depending on buffer status within the maximum TXOP.

The following description is made in the context of a transmitter and a receiver to prevent the power saving mode from being limited to downlink data transmission. Therefore, the transmitter and the receiver can be either a BS or an MS.

Figure 4:
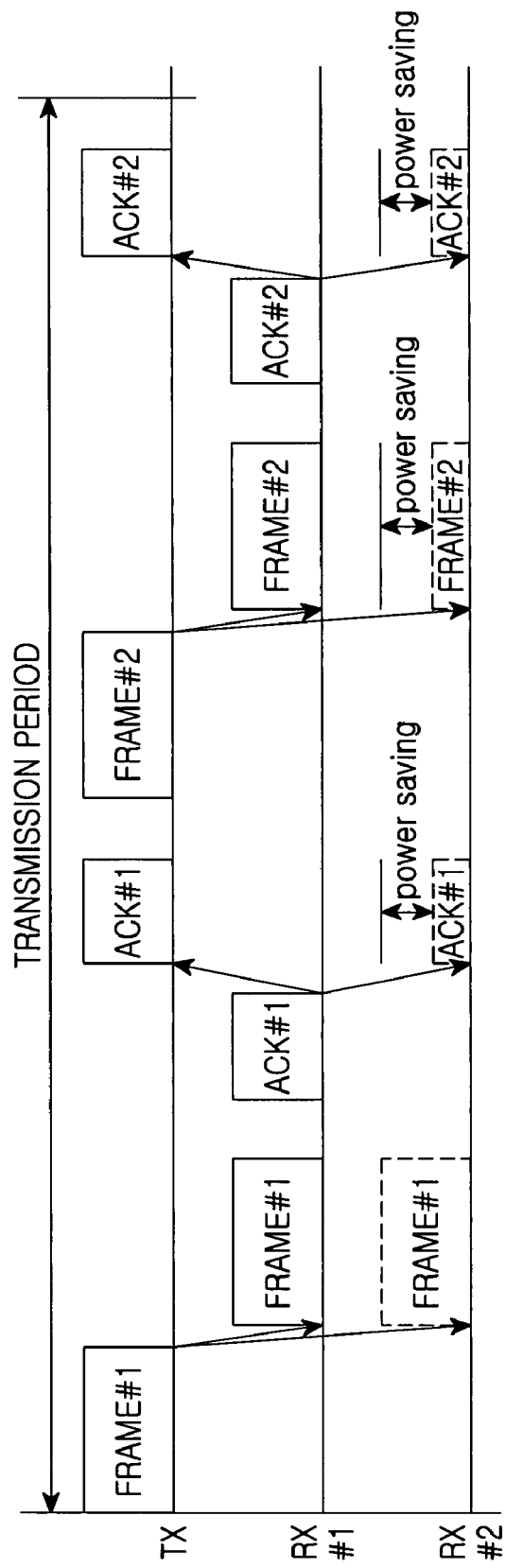
FIG. 4 illustrates a timing diagram of an example of contention-based data transmission and data reception in a mobile communication system and where the power saving method according to the present invention is applied.

FIG. 4 is a timing diagram illustrating an example of contention-based data transmission and data reception in a mobile communication system and where the power saving method according to the present invention is applied. Here, a transmitter sends data frames to a first receiver in a mobile communication network with one transmitter and two receivers. Although more data frames can be sent during a transmission period, for convenience, only two data frames are shown in FIG. 4.

In FIG. 4, the transmitter (TX) sends a first data frame to a first receiver (RX #1) during a transmission period allowed for the first receiver. Typically, the header of a data frame includes a source address and a destination address. Hence, the source and the destination of the first data frame are the transmitter and the first receiver, respectively.

The first receiver and a second receiver both receive the data frame. These receivers commonly have the configuration illustrated in FIG. 3.

In operation, upon receipt of the first data frame, the first receiver detects the destination address of the first data frame. Since the destination address of the first data frame is the first receiver, the first receiver sends an ACK signal for the first data frame. The first receiver then continues receiving data frames from the transmitter during the transmission period.

Also, upon receipt of the first data frame, the second receiver detects the destination address of the first data frame. Since the destination address of the first data frame is the first receiver, the second receiver discards the first data frame and blocks power supply from the data processor 324 of the physical layer 320. Hence, the second receiver operates in the power saving mode. As defined before, the power saving mode is an operation mode in which the receiver monitors whether the channel is busy or idle. In FIG. 4, the second receiver consumes some power even in the power saving mode. Yet, the power is confined to monitoring whether the channel is busy or idle and it is noted that power is saved in the power saving mode, compared to a normal operation mode.

A decision is made as to whether the channel is busy or idle by a combination of a few factors including a received signal strength and a signal quality assessed from a preamble. According to the status of the channel, a CCA is generated. The CCA is a 1-bit data value indicating whether the channel delivers any data signal, i.e. whether the channel is busy or idle (1=busy, 0=idle).

The second receiver is kept in the power saving mode until the channel is kept idle for a predetermined time period. The predetermined time period should be a time period enough for the second receiver to be aware that the data transmission has been completed. For example, the predetermined time period can be the interval between data frames or the time from ACK transmission to reception of the next data frame.

If the channel is idle for the predetermined time period, the second receiver releases the power saving mode. Then the second receiver receives a first data frame in the next transmission period and determines whether this transmission period is allowed for the second receiver.

Figure 5:
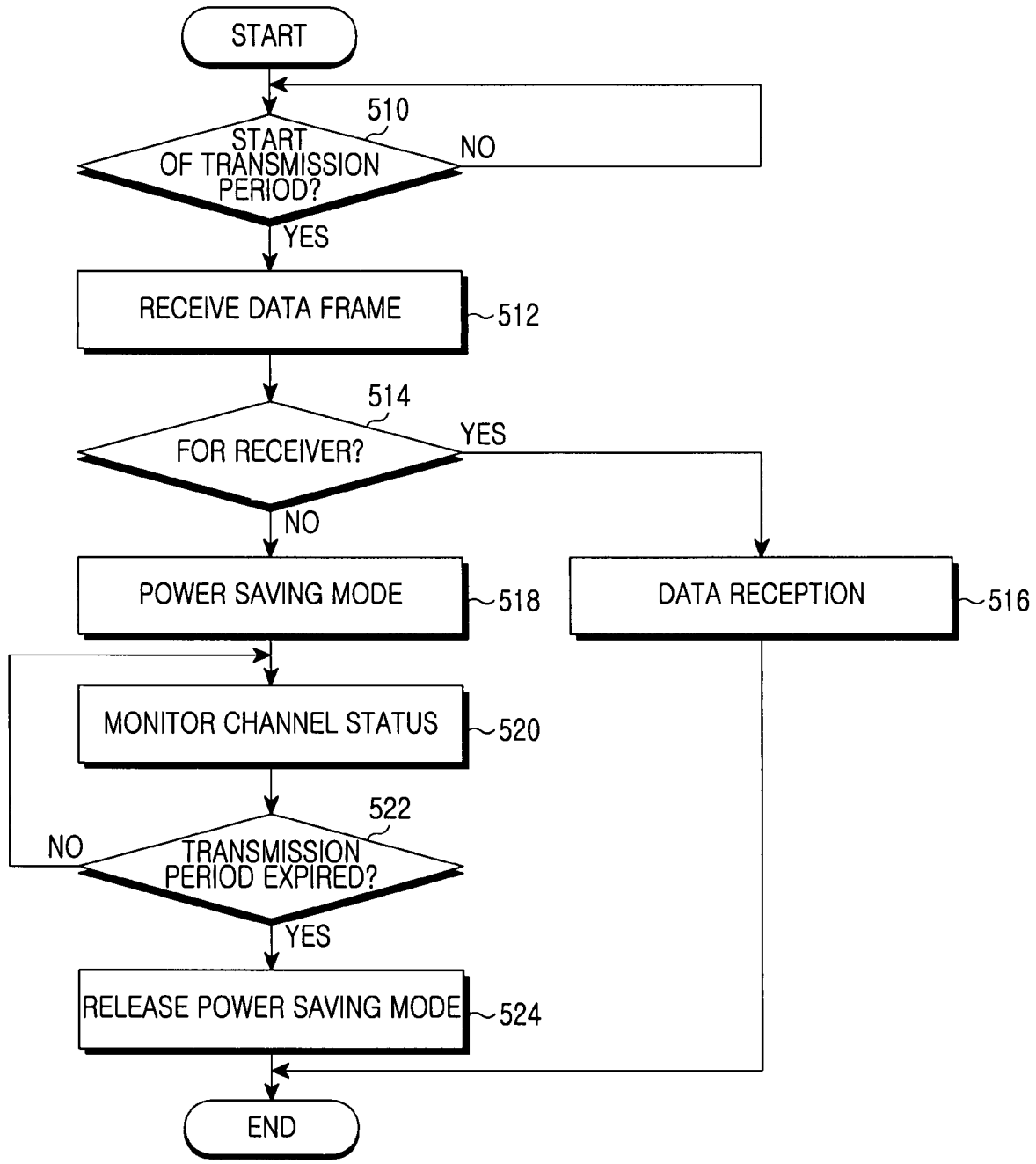
FIG. 5 is a flow diagram illustrating a control operation of the receiver in the mobile communication system where data transmission is contention-based and where the power saving method according to the present invention is applied.

FIG. 5 is a flow diagram illustrating a control operation of the receiver in the mobile communication where the power saving method according to the present invention is applied. Here, the control operation is repeated in each transmission period. In general, transmission periods are successive in the mobile communication system. Thus, it is obvious that the control operation is iterated in each transmission period.

Further in FIG. 5, the receiver determines whether a new transmission period starts in step 510. The determination can be made by checking whether a channel has been idle for a predetermined time period in the previous transmission period.

If the new transmission period starts, the receiver receives a first data frame in the new transmission period and detects a destination address from the header of the first data frame in step 512. In step 514, the receiver determines whether the data frame is destined for the receiver by comparing the destination address with the address of the receiver.

If the destination address is the address of the receiver, the receiver receives data frames during the transmission period in step 516. The receiver also sends ACK signals for the received data frames.

Conversely, if the destination address is different from the address of the receiver, the receiver is switched to the power saving mode or kept in the power saving mode in step 518. In the former case, the controller 310 outputs an RPS enable signal to the data processor 324 and the data processor 324 cuts off operation power from itself. This state is defined as the power saving mode in the present invention.

In step 520, the receiver monitors the current status of a channel. The monitoring amounts to determining whether the channel delivers any signal. The receiver determines whether the transmission period has expired, i.e. whether the channel is idle for a predetermined time period in step 522. The reason for monitoring whether the absence of any signals on the channel continues for the predetermined time period is to take into account the interval between data frames or the time taken to send an ACK signal.

If the transmission period has not expired, the receiver continues monitoring the channel status in step 520. On the other hand, upon time expiration, the receiver releases the power saving mode in step 524. For the release of the power saving mode, the controller 310 provides a power saving mode release command (i.e. an RPS disable signal) to the data processor 324 and the data processor 324 resumes the power supply.

After the power saving mode is released, the receiver performs step 510 through step 524 in a new transmission period.

Figure 6:
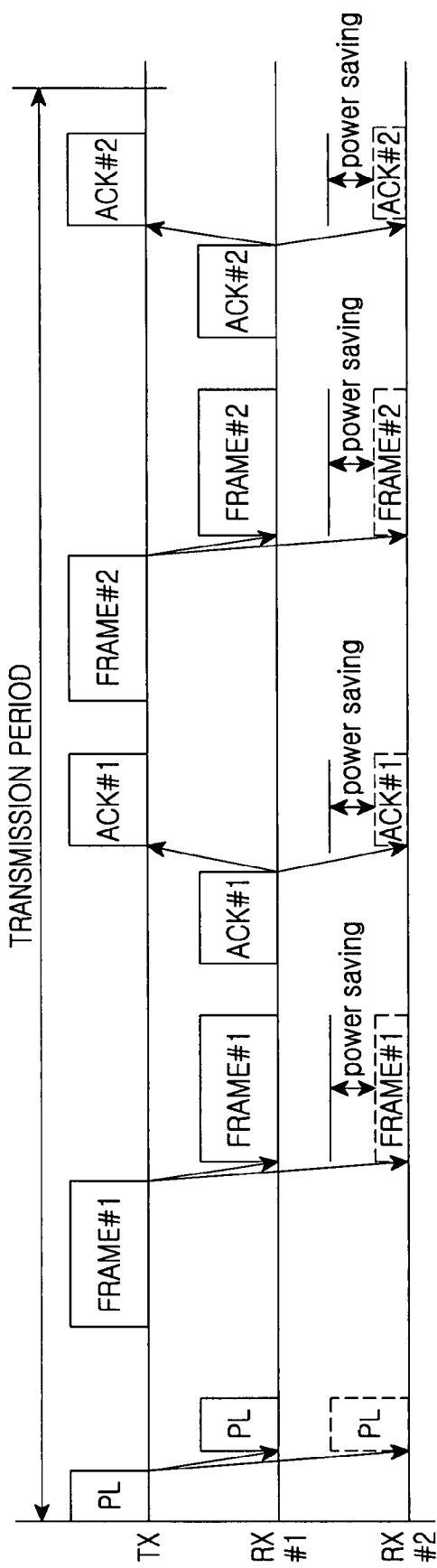
FIG. 6 illustrates a timing diagram of an example of non-contention-based data transmission and data reception in a mobile communication system and where the power saving method according to the present invention is applied.

FIG. 6 illustrates a timing diagram of an example of non-contention-based data transmission and data reception in a mobile communication system and where the power saving method according to the present invention is applied. Here, a transmitter sends a polling signal to a first receiver in a mobile communication network with one transmitter and two receivers. Although more data frames can be sent during a transmission period, for convenience, only two data frames are shown in FIG. 6.

In FIG. 6, the transmitter (TX) sends a polling signal allowing a transmission period for a first receiver (RX #1) at the start of the transmission period. The first receiver and a second receiver (RX #2) receive the polling signal and find out that the transmission period is dedicated to the first receiver.

After sending the polling signal, the transmitter starts to send data frames during the transmission period. As the first receiver determines that the transmission period has been allocated to it, it continues receiving the data frames from the transmitter during the transmission period.

Since the second receiver is aware that the transmission period is not allowed for it, the second receiver blocks power supply from the data processor 324 of the physical layer 320. Hence, the second receiver operates in the power saving mode. The second receiver only monitors whether the channel is busy or idle, thus consuming minimal operational power for the monitoring. Advantageously, the power saving mode saves power when compared to a normal operation mode.

The decision is made as to whether the channel is busy or idle by a combination of a few factors including a received signal strength and a signal quality assessed from a preamble. According to the status of the channel, a CCA is generated. The CCA is a 1-bit data value indicating whether the channel delivers any data signal, i.e. whether the channel is busy or idle (1=busy, 0=idle).

The second receiver is kept in the power saving mode until the channel is kept idle for a predetermined time period. The predetermined time period should be a time period enough for the second receiver to be aware that the data transmission has been completed. For example, the predetermined time period can be the interval between data frames or the time from ACK transmission to reception of the next data frame.

If the channel is idle for the predetermined time period, the second receiver releases the power saving mode. Then the second receiver receives a first data frame in the next transmission period and determines whether this transmission period is allowed for the second receiver.

Figure 7:
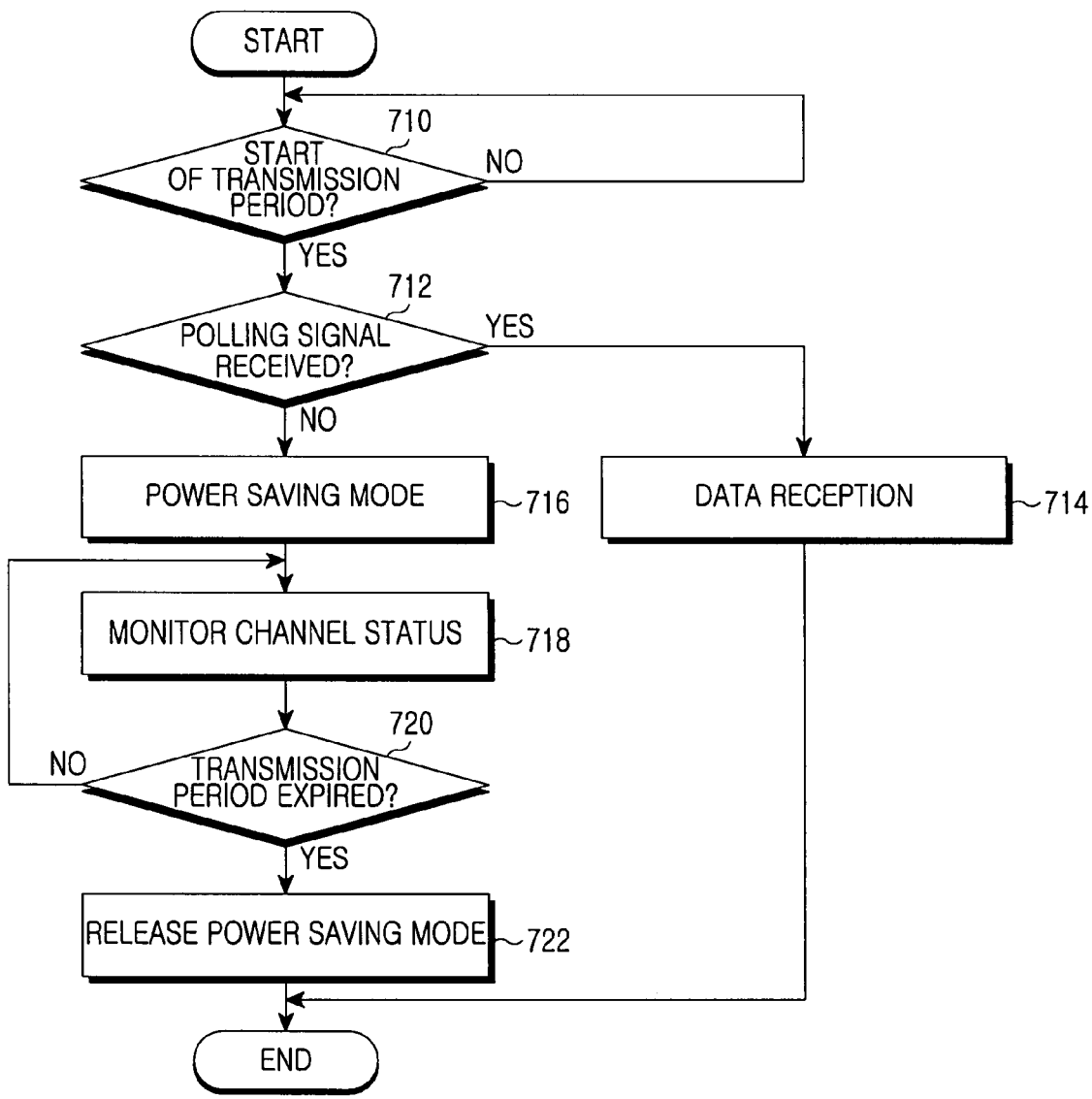
FIG. 7 is a flow diagram illustrating a control operation of the receiver in the mobile communication system where data transmission is non-contention-based and where the power saving method according to the present invention is applied.

FIG. 7 is a flow diagram illustrating a control operation of the receiver in the mobile communication system where data transmission is non-contention-based and where the power saving method is applied according to the present invention. The control operation is for one transmission period. Since in general, transmission periods are successive in the mobile communication system, it is obvious that the control operation is iterated in each transmission period.

In FIG. 7, the receiver determines whether a new transmission period starts in step 710. The determination can be made by checking whether a channel has been idle for a predetermined time period in the previous transmission period. In case of non-contention-based data transmission, step 710 may not be performed.

Here, if the new transmission period starts, the receiver receives a polling signal and determines whether the transmission period has been allocated to the receiver by the polling signal in step 712.

If the transmission period is allowed for the receiver, it then receives data frames from the transmitter during the transmission period in step 714. The receiver also sends ACK signals for the received data frames.

Conversely, if the polling signal indicates that the transmission period is not for the receiver, it is switched to the power saving mode or kept in the power saving mode in step 716. In the former case, the controller 310 outputs an RPS enable signal to the data processor 324 and the data processor 324 cuts off operation power from itself. This state is defined as the power saving mode in the present invention.

In step 718, the receiver monitors the current status of a channel. The monitoring amounts to measuring the strength of a signal received on the channel. The receiver determines whether the transmission period has expired, i.e. whether the channel is idle for a predetermined time period in step 720. The reason for monitoring whether the absence of any signals on the channel continues for the predetermined time period is to take into account the interval between data frames or the time taken to send an ACK signal.

If the transmission period has not expired, the receiver continues monitoring the channel status in step 718. On the other hand, upon time expiration, the receiver releases the power saving mode in step 722. For the release of the power saving mode, the controller 310 provides a power saving mode release command (i.e. an RPS disable signal) to the data processor 324 and the data processor 324 resumes the power supply.

After the power saving mode is released, the receiver performs step 710 through step 722 in a new transmission period.

Exemplary embodiments of the power saving mode for WLANs will be described below.

Generally, a WLAN finds its wide use in various wireless user environments. The WLAN is simple but robust against transmission failure. Despite these advantages, the WLAN is not effective in guaranteeing Quality of Service (QoS) because it is based on best effort data. In this context, efforts have been made to increase a MAC scheme for QoS guarantee in the WLAN.

Such efforts have been envisioned as contention-based channel control called EDCA and polling-based channel control called HCCA. The EDCA is an extension from DCF. It provides QoS-based services by prioritization. The HCCA is an extension from HCF, in which a TXOP for QoS data is granted by polling using a parameter. The exemplary embodiments of the present invention will be separately described regarding EDCA and the HCCA. WLANs use Carrier Sense Multiple Access/Collision Avoidance (CSMA/CA) as a wireless access technique to provide fair wireless medium access to all MSs.

A-1. EDCA

An exemplary embodiment of the present invention in which the power saving method of the present invention is applied to the EDCA will be described in detail below.

Figure 8:
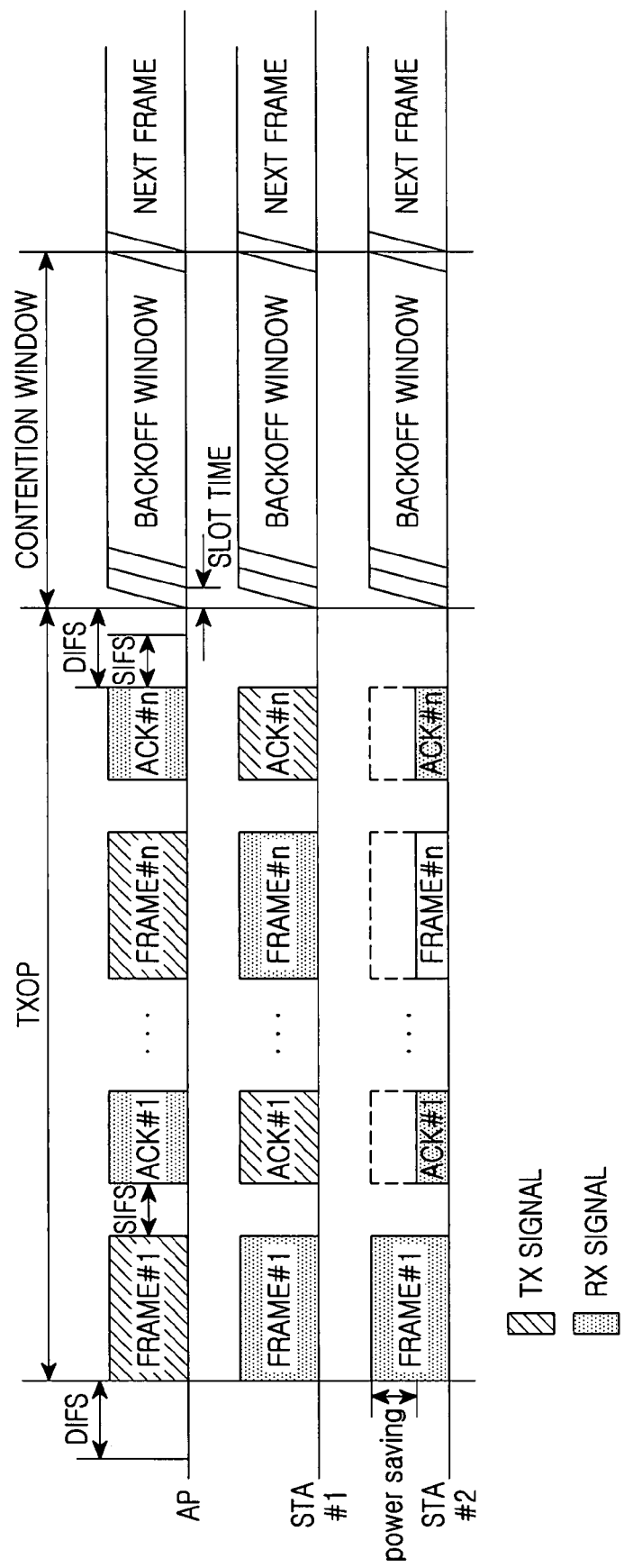
FIG. 8 is a timing diagram illustrating data transmission and data reception in an Enhanced Distributed Channel Access (EDCA) Wireless Local Area Network (WLAN) where the power saving method according to the present invention is applied.

FIG. 8 illustrates a timing diagram of data transmission and data reception in an EDCA WLAN to which the power saving method is applied according to the present invention. In the illustrated case of FIG. 8, an Access Point (AP) sends data frames to a first STAtion (STA) (STA #1) in a WLAN with one AP and two STAs. Herein, the terms "AP" and "STA" are interchangeably used with "BS" and "MS" in the same sense.

In FIG. 8, the AP sends a first frame (FRAME #1) to STA #1 during a TXOP allowed for STA #1. Typically, the header of a data frame includes a source address and a destination address. Hence, the source and the destination of FRAME #1 are the AP and STA #1, respectively. A TXOP is allocated on an STA basis and signal transmission/reception takes place every SIFS.

STA #1 and a second STA (STA #2) both receive FRAME #1. These STAs commonly have the configuration illustrated in FIG. 3.

Upon receipt of FRAME #1, STA #1 detects the destination address of the first data frame. Since the destination address of FRAME #1 is STA #1, STA #1 sends an ACK signal (ACK #1) for FRAME #1. STA #1 then continues receiving data frames from the transmitter during the TXOP.

Upon receipt of FRAME #1, STA #2 detects the destination address of FRAME #1. Since the destination address of FRAME #1 is STA #1, STA #2 discards FRAME #1 and blocks power supply from the data processor 324 of the physical layer 320. Hence, STA #2 operates in the power saving mode. As defined before, the power saving mode is an operation mode in which the receiver monitors whether the channel is busy or idle. In FIG. 8, STA #2 consumes some power even in the power saving mode. Yet, the power is confined to monitoring whether the channel is busy or idle and it is noted that power is saved in the power saving mode, compared to a normal operation mode.

A decision is made as to whether the channel is busy or idle by a combination of a few factors including a received signal strength and a signal quality assessed from a preamble. According to the status of the channel, a CCA is generated. The CCA is a 1-bit data value indicating whether the channel delivers any data signal, i.e. whether the channel is busy or idle (1=busy, 0=idle).

STA #2 is kept in the power saving mode until the channel is kept idle for a predetermined time period. The predetermined time period should be a time period enough for STA #2 to be aware that the data transmission has been completed. For example, the predetermined time period can be the SIFS defining the time between packets.

If the channel is idle for the SIFS, STA #2 releases the power saving mode. Then STA #2 receives a first data frame in the next TXOP and determines whether this TXOP is allowed for STA #2.

As described above, STA #2 determines from a first data frame in a TXOP whether the TXOP has been allocated to STA #2. If the TXOP is not for STA #2, it cuts off power supply from the data processor 324 during the remainder of the TXOP.

A-2. HCCA

An exemplary embodiment of the present invention in which the power saving method of the present invention is applied to the HCCA will be described in detail below.

Figure 9:
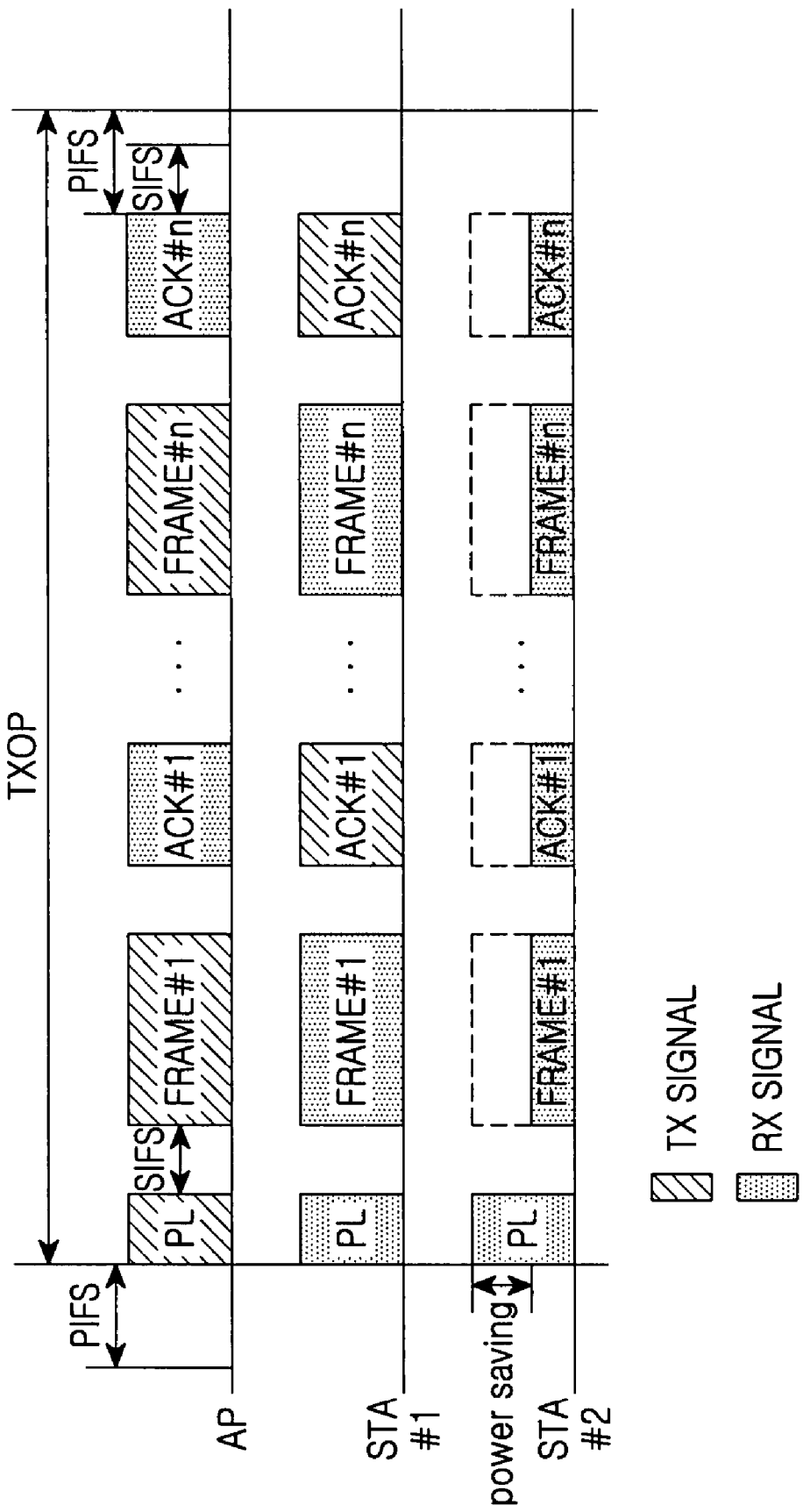
FIG. 9 is a timing diagram illustrating data transmission and data reception in a Hybrid Coordinate Function (HCF) Channel Access (HCCA) Wireless Local Area Network (WLAN) where the power saving method according to the present invention is applied.

FIG. 9 illustrates a timing diagram of data transmission and data reception in an HCCA WLAN where the power saving method is applied according to the present invention. In the illustrated case of FIG. 9, an AP sends a polling signal to STA #1 in a mobile communication network with one AP and two STAs.

In FIG. 9, the AP sends a polling signal allowing a TXOP for STA #1 at the start of the TXOP. STA #1 and STA #2 receive the polling signal and find out that the TXOP is dedicated to STA #1.

After sending the polling signal, the AP starts to send data frames during the TXOP. As STA #1 determines that the TXOP has been allocated to it, it continues receiving the data frames from the AP during the TXOP.

Since STA #2 is aware that the TXOP is not allowed for it, STA #2 blocks power supply from the data processor 324 of the physical layer 320. Hence, STA #2 operates in the power saving mode. STA #2 only monitors whether the channel is busy or idle, thus consuming minimal operational power for the monitoring. As a result, the power saving mode saves power when compared to a normal operation mode.

The decision is made as to whether the channel is busy or idle by measuring the strength of a received signal. If the received signal strength is equal to or larger than a predetermined threshold, it is determined that the channel is busy. ON the contrary, if the received signal strength is below the threshold, it is determined that the channel is idle.

STA #2 is kept in the power saving mode until the state of the received signal strength channel being below the threshold is kept for a predetermined time period. The predetermined time period should be a time period enough for the second receiver to be aware that the data transmission has been completed. For example, the predetermined time period can be the SIFS defining the interval between packet transmissions/receptions.

If the received signal strength is kept below the threshold for the predetermined time period, STA #2 releases the power saving mode. Then STA #2 receives a first data frame in the next TXOP and determines whether this TXOP is allowed for STA #2.

A-3. Simulation Result

FIG. 10 is a chart illustrating an example of a power saving method according to the present invention.

Without the power saving method of the present invention, an MS usually consumes about 186 nW in its receiver module. In contrast, the MS only consumes 25 mW in its receiver module by utilizing the power saving method, equaling roughly an 86% decrease in power consumption.

As described above, a MS simply monitors the channel status with minimal operation power during a transmission period without data destined for the MS in the present invention. Therefore, both the operation time of the MS with limited operational power is increased and the time taken to send/receive data in a new allocated transmission period is minimized.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A data transceiver in a mobile communication system, comprising:
   a transmitter for transmitting data frames; and
   a receiver for determining whether a transmission period is allowed based on a destination address of a first data frame from among a plurality data frames received from another transmitter, receiving the plurality of data frames during the transmission period, if the transmission period is allowed, and monitoring with minimal operation power whether transmission of the plurality of data frames is in progress or completed in the transmission period, if the transmission period is not allowed.

2. The data transceiver of claim 1, wherein the receiver determines whether the transmission period is allowed by a polling signal received from the other transmitter at a start of the transmission period.

3. The data transceiver of claim 2, wherein the receiver supplies operational power to a RF processor for outputting a received signal and a signal strength detector for measuring a strength of the received signal received outputted from the RF processor during the transmission period, if the transmission period is not allowed.

4. The data transceiver of claim 1, wherein the receiver supplies operational power to a Radio Frequency (RF) processor for outputting a received signal and a signal strength detector for measuring a strength of the received signal outputted from the RF processor during the transmission period, if the transmission period is not allowed.

5. The data transceiver of claim 1, wherein the receiver comprises:
   an RF processor for outputting a received signal;
   a data processor for processing the received signal outputted from the RF processor;
   a signal strength detector for measuring a strength of the received signal outputted from the RF processor; and
   a controller for commanding operation power cut-off to the data processor if the transmission period is not allowed, and commanding operational power supply to the data processor if it is determined from the strength of the received signal measured from the signal strength detector that the transmission of the plurality of data frames is completed in the transmission period.

6. The data transceiver of claim 5, wherein if the strength of the received signal is kept below a threshold for a predetermined time, the controller determines that the transmission of the plurality of data frames is completed in the transmission period.

7. The data transceiver of the claim 1, wherein the receiver supplies the minimal operation power required for monitoring whether a channel used between the other transmitter and the receiver is used to transmit a signal, if the transmission period is not allowed.

8. The data transceiver of the claim 1, wherein the receiver determines that the transmission of the data frames is completed in the transmission period, if no signal is detected from a channel used between the other transmitter and the receiver for a predetermined time in the transmission period.

9. A method of a receiver for receiving a plurality of data frames in a mobile communication system where the plurality of data frames are transmitted and received during a transmission period, the method comprising:
   determining whether the transmission period is allowed for the receiver based on a destination address of a first data frame from among the plurality data frames;
   receiving the plurality of data frames during the transmission period, if the transmission period is allowed; and
   monitoring with minimal operation power whether transmission of the plurality of data frames is in progress or completed in the transmission period, if the transmission period is not allowed.

10. The method of claim 9, wherein the determining further comprises determining whether the transmission period is allowed by a polling signal received from a transmitter at a start of the transmission period.

11. The method of claim 9, wherein the monitoring further comprises supplying the minimal operation power required for monitoring whether a channel used by a receiver is used to transmit a signal, if the transmission period is not allowed.

12. The method of claim 9, wherein the monitoring further comprises determining that the transmission of the plurality of data frames is completed in the transmission period, if no signal is detected from a channel used by the receiver for a predetermined time in the transmission period.

13. A data transceiver in a mobile communication system, comprising:
   a transmitter for transmitting data frames;
   a receiver for receiving a first data frame from among a plurality of data frames received from another transmitter, transmitted during a transmission period, determining if the data frame is destined for the receiver based on a destination address of a first data frame, and monitoring with minimal operation power whether data transmission of the plurality of data frames is in progress or completed in the transmission period, if the data frame is not destined for the receiver.

14. The data transceiver of claim 13, wherein the receiver determines that the data transmission period is finished and resumes operation power.

15. The data transceiver of the claim 14, wherein the receiver determines that the transmission period is finished when a channel used between the other transmitter and receiver is idle for a predetermined time.

16. The data transceiver of the claim 13, wherein the receiver supplies the minimal operation power required for monitoring whether a channel used between the other transmitter and the receiver is used to transmit a signal, if the data frame is not destined for the receiver.

17. The data transceiver of the claim 13, wherein the receiver determines that the transmission of the plurality of data frames during the transmission period is completed, if no signal is detected from a channel used between the other transmitter and the receiver for a predetermined time in the transmission period.

* * * * *